Oct. 22, 1929.  W. J. SPIRO  1,732,992
ADJUSTABLE SECURING BOLT
Filed Aug. 24, 1927
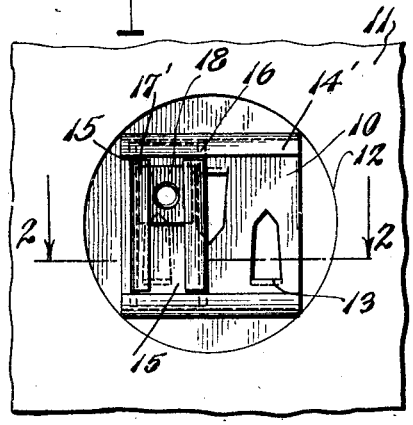
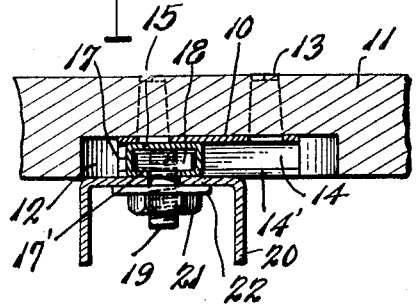
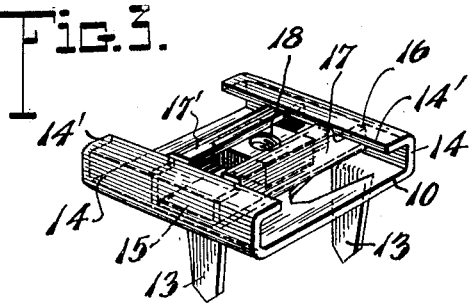
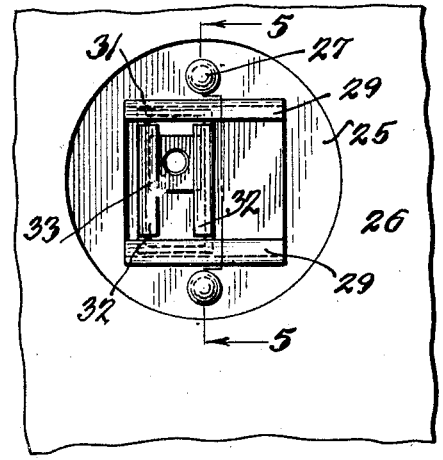
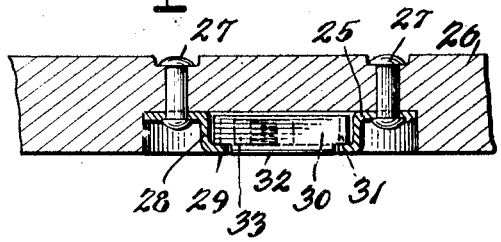
Inventor
W. J. Spiro
By Alfred T. Gage.
Attorney Patented Oct. 22, 1929

1,732,992

UNITED STATES PATENT OFFICE

WALTER J. SPIRO, OF WHITE PLAINS, NEW YORK

ADJUSTABLE SECURING BOLT

Application filed August 24, 1927. Serial No. 215,060.

This invention relates to an adjustable securing bolt, and particularly to a construction providing for an extended adjustment of the bolt in its mounting transversely of the axis of the bolt to aline it with an object to be secured.

The invention is adapted for application to various arts, but is especially designed for use in connection with an automobile running board of a replaceable character, such as shown in my Patent No. 1,356,835 dated Oct. 26, 1920. In this patent the bolt head has only a limited play or movement upon its retaining plate to permit proper alinement for the threading of the stem into the head nut, and was not intended to accommodate a material difference in the position of a part to be assembled by the bolt. The present invention provides for a more extended adjustment for the retained end of the bolt in a position resultant of intersecting planes of movement so as to aline the bolt with a fixed part to which it is to be secured.

In practically all replacement parts there is some distortion of the original relation of the assembled members, for instance, when running boards are replaced after accidents the step hangers by which they are supported are often displaced or bent so as not to aline with the securing devices upon the running board, so that it becomes necessary to change the position of the bolt upon the board to engage the fixed hanger which is generally so secured that it cannot be adjusted. Such adjustment of the securing bolts is also often necessary when the style of running board is changed even though the hangers are not distorted. To properly provide for the adjustment of the bolt there must be a movement thereof in more than one direction transverse to its axis while the bolt must be retained against rotation to permit the application of the securing nut.

To effect these desirable results, I have provided a novel and improved construction of bolt mounting including a fixed retaining member and a carrier movably mounted thereon and supporting the head member of a bolt for shifting therein transversely to its axis.

A further object of the invention is to provide a new mounting for a securing bolt carrying movable means constructed to retain the bolt member against rotation and permit guided adjustment thereof in more than one plane transverse to the axis of the bolt.

Another object of the invention is to present an improved construction of fixed retainer having parallel flanges which slidably support a carrier having a way to engage a bolt head member and permit adjustment thereof transversely of the bolt axis and at angle to the path of adjustment of the carrier within the retainer.

Other and further objects and advantages of the invention will be hereinafter set forth and the novel features thereof defined by the appended claims.

In the drawing—

Figure 1 is a bottom plan of the mounting seated in a support;

Figure 2 is a vertical section showing the parts assembled; on line 2—2 of Figure 1;

Figure 3 is a detail perspective of the mounting;

Figure 4 is a bottom plan of a modified form of the invention; and

Figure 5 is a vertical section on line 5—5 of Fig. 4.

Like numerals refer to like parts in the several figures of the drawing.

In the application of the invention shown in Figures 1, 2 and 3, the retainer 10 is fixed upon a suitable support 11, such as a running board, and disposed within a recess 12 at the under face thereof. This retainer may be secured in any desired manner, for instance, by the prongs 13 cut and bent therefrom for insertion in the board. The opposite ends of the retainer are bent angularly at 14 and inturned at their free edges 14' to form parallel guide flanges for the bolt carrier 15 which is formed with reduced end portions 16 fitting beneath the flanges. This carrier is provided with parallel longitudinal flanges 17 having inturned edges 17' which enclose and overhang a head nut 18 adjustable lengthwise of the carrier and transversely of the retainer flanges. This nut receives the threaded stem 19, which when applied thereto forms a head equivalent to the usual angular head of a bolt, and it is apparent that the latter may be used. When the parts are to be assembled this stem is adjusted into alinement with an aperture on the part to be attached, such as the step hanger 20, and affixed by the securing nut 21 and interposed washer 22.

The flanges of the retainer and carrier are disposed in substantially the same plane to provide a level contact face for an abutting member.

In the modified form of the invention shown in Figures 4 and 5, the retainer 25 is circular in shape and secured within a recess in the board 26 by rivets 27. The body of the retainer plate is cut out and bent to form opposite angular flanges 28 having free edges 29 which overhang the ends of a carrier 30 slidably mounted beneath the flanges. The carrier is formed as a loop 31 having inturned flanges 32 which embrace and hold the bolt head member 33 against rotation while permitting its adjustment longitudinally of the carrier and transversely to the plane of the carrier adjustment upon the retainer. The point of intersection of the planes of movement may be shifted to cover a wide area of adjustment, an extreme of which is indicated in Figures 4 and 5.

In assembling the mounting the head nut is inserted within the carrier and the latter disposed within the flanges of the retainer before its insertion in the recess of the board. This permits the bolt stem or shank to be removed from its head for convenient packing of the boards in flat relation, and when applied in use it is only necessary to thread the stem into the retained head. The construction provides simple and efficient means for a wide field of adjustment and when the securing nut is applied to the attached object all the parts are clamped in position.

While a specific embodiment of the invention has been shown and described it is not confined thereto, as changes and alterations may be made without departing from the spirit of the invention as recited in the following claims.

What I claim is:—

1. An adjustable mounting for a securing bolt including a fixed retainer, and a carrier of substantially the depth of the retainer mounted to abut opposite faces thereof and freely slide therein and having a way to confine and prevent displacement of a bolt head member from the base of the carrier while permitting sliding adjustment of such member transversely of the bolt axis and at an angle to the path of travel of the carrier upon the retainer.

2. An adjustable mounting for a bolt including a retainer having a body with parallel inturned flanges at opposite sides forming a slide way, and a carrier mounted to contact with the base of the retainer and said flanges for free sliding adjustment in said way and provided with means to embrace and slidably retain the head member of a bolt to prevent displacement axially of said bolt and for sliding movement at a right angle to the travel of the carrier.

3. An adjustable mounting for a bolt including a retainer provided with a base having securing members and parallel flanges inturned at their free edges, and a carrier U-shaped in cross section and confined at its ends by said flanges and provided with inturned free edges forming flanges to embrace and slidably support a bolt head member, the flanges of said retainer and carrier being disposed in subtsantially the same plane.

In testimony whereof I affix my signature.

WALTER J. SPIRO.